US012132287B2

(12) United States Patent
Motoshige

(10) Patent No.: US 12,132,287 B2
(45) Date of Patent: Oct. 29, 2024

(54) CONNECTOR WITH ROTATION RESTRICTION

(71) Applicant: Yazaki Corporation, Tokyo (JP)

(72) Inventor: Yuichi Motoshige, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 180 days.

(21) Appl. No.: 17/876,751

(22) Filed: Jul. 29, 2022

(65) Prior Publication Data

US 2023/0033697 A1 Feb. 2, 2023

(30) Foreign Application Priority Data

Jul. 29, 2021 (JP) ................................ 2021-124500

(51) Int. Cl.
*H01R 39/60* (2006.01)
*H01R 12/91* (2011.01)

(52) U.S. Cl.
CPC ............ *H01R 39/60* (2013.01); *H01R 12/91* (2013.01)

(58) Field of Classification Search
CPC ........... H01R 39/60; H01R 4/30; H01R 12/91
See application file for complete search history.

(56) References Cited

U.S. PATENT DOCUMENTS

| | | | | |
|---|---|---|---|---|
| 1,222,721 A * | 4/1917 | Bissell | H01R 13/6315 439/252 |
| 8,956,170 B2 * | 2/2015 | White | H01R 13/405 439/252 |
| 2018/0006401 A1 | 1/2018 | Ishibashi et al. | |
| 2018/0248275 A1 | 8/2018 | Morita et al. | |
| 2018/0337492 A1 | 11/2018 | Aoki et al. | |

FOREIGN PATENT DOCUMENTS

| | | |
|---|---|---|
| JP | 6653291 B2 | 2/2020 |
| WO | 2020/208678 A1 | 10/2020 |

* cited by examiner

*Primary Examiner* — Renee S Luebke
*Assistant Examiner* — Paul D Baillargeon
(74) *Attorney, Agent, or Firm* — Sughrue Mion, PLLC

(57) ABSTRACT

A connector includes: a rod-shaped terminal; and a housing having a terminal accommodating chamber configured to accommodate the terminal. The terminal has: a rotation restricting portion configured to engage with an inner wall of the terminal accommodating chamber to restrict rotation of the terminal about an axis of the terminal; a contact configured to be electrically connected to a counterpart terminal; and a hole configured to allow a bolt to be screwed into the hole about the axis. The housing has: a holding portion that holds the terminal inside the terminal accommodating chamber; and an opening configured to expose the hole of the terminal to an outside of the terminal accommodating chamber. The connector is configured to have a gap between the inner wall of the terminal accommodating chamber and the terminal, the gap increasing from the rotation restricting portion of the terminal toward the opening of the housing.

6 Claims, 8 Drawing Sheets

CONNECTOR WITH ROTATION RESTRICTION

CROSS-REFERENCE TO RELATED APPLICATIONS

This application is based on and claims priority under 35 USC 119 from Japanese Patent Application No. 2021-124500 filed on Jul. 29, 2021, the contents of which are incorporated herein by reference.

TECHNICAL FIELD

The present disclosure relates to a connector including a rod-shaped terminal and a housing that accommodates the terminal.

BACKGROUND ART

In a related art, it has been proposed to use a rod-shaped terminal for electrical connection in an electric circuit. In one of examples of the related art, a cylindrical columnar male terminal and a hollow cylindrical tubular female terminal are used as this type of rod-shaped terminal. The male terminal is inserted into a hollow portion of the female terminal, and a spring-shaped contact provided in the hollow portion of the female terminal is pressed and brought into contact with the male terminal, so that the terminals are electrically connected to each other (see, for example, WO2020/208678A1).

In the above-described example of the related art, the male terminal is attached to one end of a support portion fixed to a terminal block, and an external terminal is connected to a connection socket (hole) provided at the other end of the support portion. Here, for example, in a case where an annular external terminal (so-called LA terminal) is bolted to the connection socket, since the connection socket is sufficiently firmly fixed to the terminal block, rotation of the connection socket and the male terminal (that is, co-rotation), inclination of the male terminal, and the like are prevented. However, when the male terminal is firmly fixed to the terminal block via the connection socket as described above, in a case where axial misalignment, inclination, or the like occurs between the male terminal and the female terminal at the time of connection between the terminals, a force required for the connection (so-called insertion force) increases due to an increase in frictional force generated between the terminals. The increase in the insertion force may impair the workability of the connection.

As described above, it is generally difficult to simultaneously prevent the co-rotation of the terminal when the external terminal is bolted to the rod-shaped terminal and improve the workability when a counterpart terminal is connected to the rod-shaped terminal.

SUMMARY OF INVENTION

The present disclosure provides a connector that can achieve both proper bolting of an external terminal to a rod-shaped terminal and improvement in workability when a counterpart terminal is connected to the rod-shaped terminal.

A connector includes a rod-shaped terminal; and a housing having a terminal accommodating chamber configured to accommodate the terminal. The terminal has: a rotation restricting portion configured to engage with an inner wall of the terminal accommodating chamber to restrict rotation of the terminal about an axis of the terminal; a contact positioned on one side of the terminal in an axial direction of the terminal and configured to be electrically connected to a counterpart terminal; and a hole provided at an end positioned on the other side of the terminal in the axial direction and configured to allow a bolt to be screwed into the hole about the axis. The housing has: a holding portion that holds the terminal inside the terminal accommodating chamber; and an opening configured to expose the hole of the terminal to an outside of the terminal accommodating chamber. The connector is configured to have a gap between the inner wall of the terminal accommodating chamber and the terminal, the gap increasing from the rotation restricting portion of the terminal toward the opening of the housing.

The present disclosure has been briefly described above. Details of the present disclosure will be further clarified by reading through an embodiment for implementing the invention described below (hereinafter, referred to as "embodiment") with reference to the accompanying drawings.

DESCRIPTION OF EMBODIMENTS

Embodiment

Figure 2:
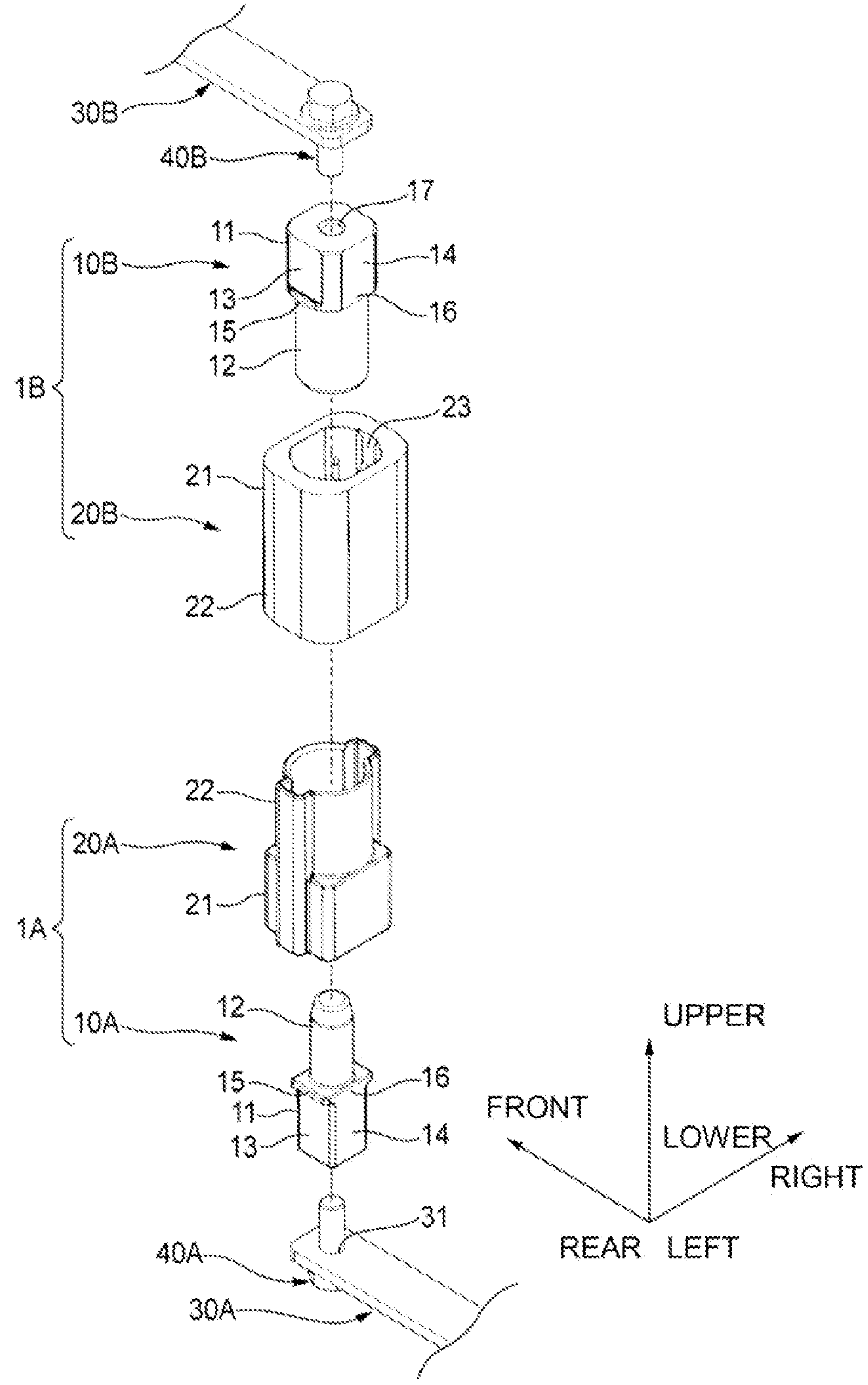
FIG. 2 is an exploded perspective view of the male connector and the female connector shown in FIG. 1.

Hereinafter, a male connector 1A and a female connector 1B according to an embodiment of the present disclosure will be described with reference to the drawings. As illustrated in FIG. 2, an external terminal 30A is bolted to a male terminal 10A included in the male connector 1A, and an external terminal 30B is bolted to a female terminal 10B included in the female connector 1B. When a male housing 20A of the male connector 1A bolted with the external terminal 30A and a female housing 20B of the female connector 1B bolted with the external terminal 30B are to be fitted to each other, the male connector 1A and the female connector 1B function to electrically connect the external terminals 30A and 30B to each other.

Hereinafter, for convenience of description, a "front-rear direction", an "upper-lower direction", and a "left-right direction" are defined, as illustrated in FIGS. 1 to 8. The "front-rear direction", the "upper-lower direction", and the "left-right direction" are orthogonal to one another. The upper-lower direction coincides with the fitting direction of the male connector 1A and the female connector 1B.

The male connector 1A and the female connector 1B have the same structure except for different types of built-in terminals (the male terminal 10A and the female terminal 10B) and opposite orientations in the upper-lower direction. Therefore, as illustrated in FIGS. 2 and 3, in the female terminal 10B and the female housing 20B included in the female connector 1B, portions corresponding to the portions of the male terminal 10A and the male housing 20A included in the male connector 1A are denoted by the same reference numerals as those of the male terminal 10A and the male housing 20A.

First, the male connector 1A will be described below. As shown in FIG. 2, the male connector 1A includes the male terminal 10A and the male housing 20A that accommodates the male terminal 10A. Hereinafter, each component constituting the male connector 1A will be described in order.

First, the male terminal 10A will be described. The male terminal 10A has a rod shape extending in the upper-lower direction, and is formed by performing a cutting process on a metal rod member as shown, for example, in FIG. 2. As shown in FIG. 2, the male terminal 10A integrally has a base 11 and a contact 12 positioned above the base 11. The contact 12 has a cylindrical columnar shape extending in the upper-lower direction. The contact 12 is connected to a later-described hollow cylindrical tubular contact 12 of the female terminal 10B as shown for example, in FIG. 3.

Figure 3:
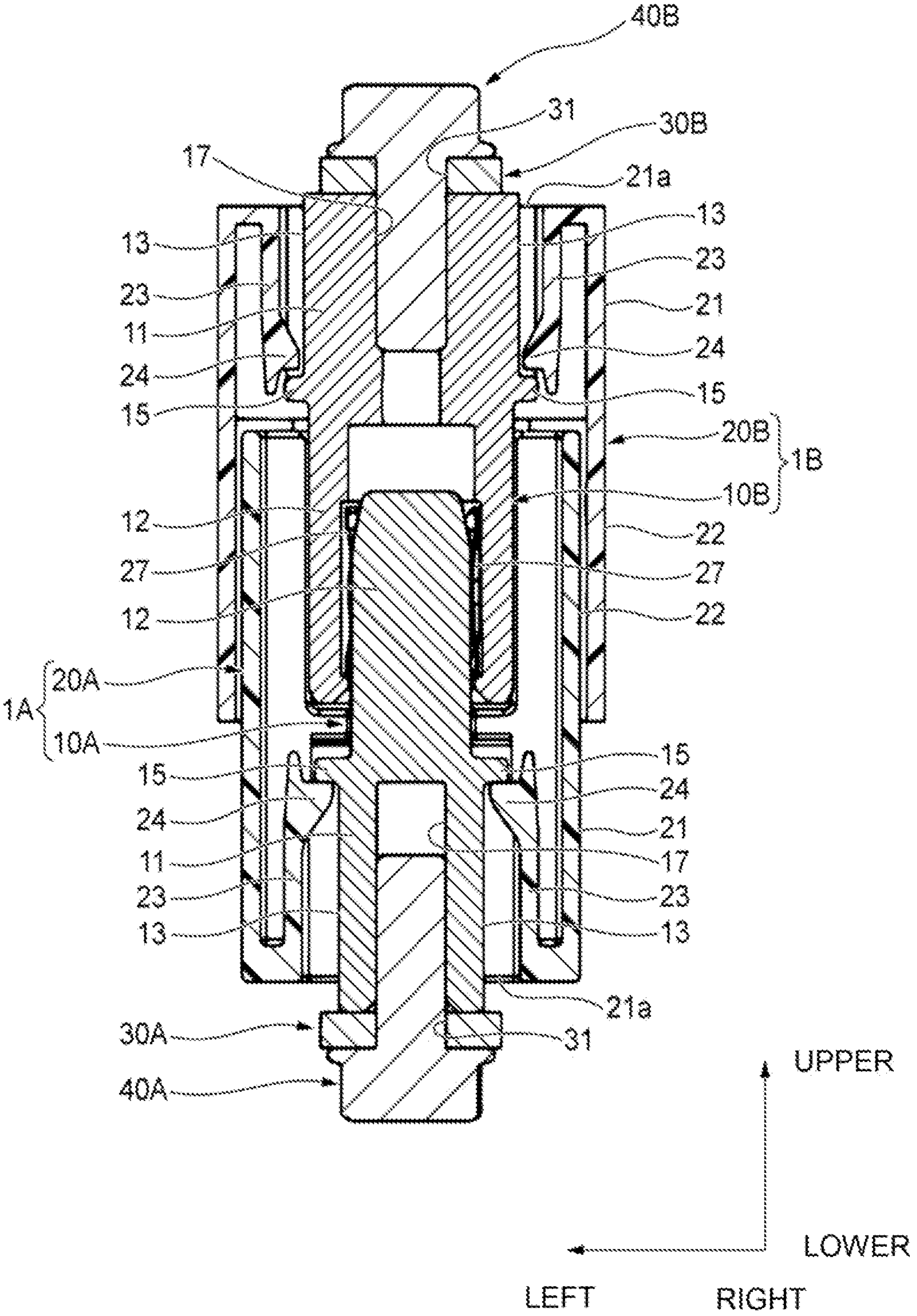
FIG. 3 is a cross-sectional view taken along a line A-A of FIG. 1.
Figure 4:
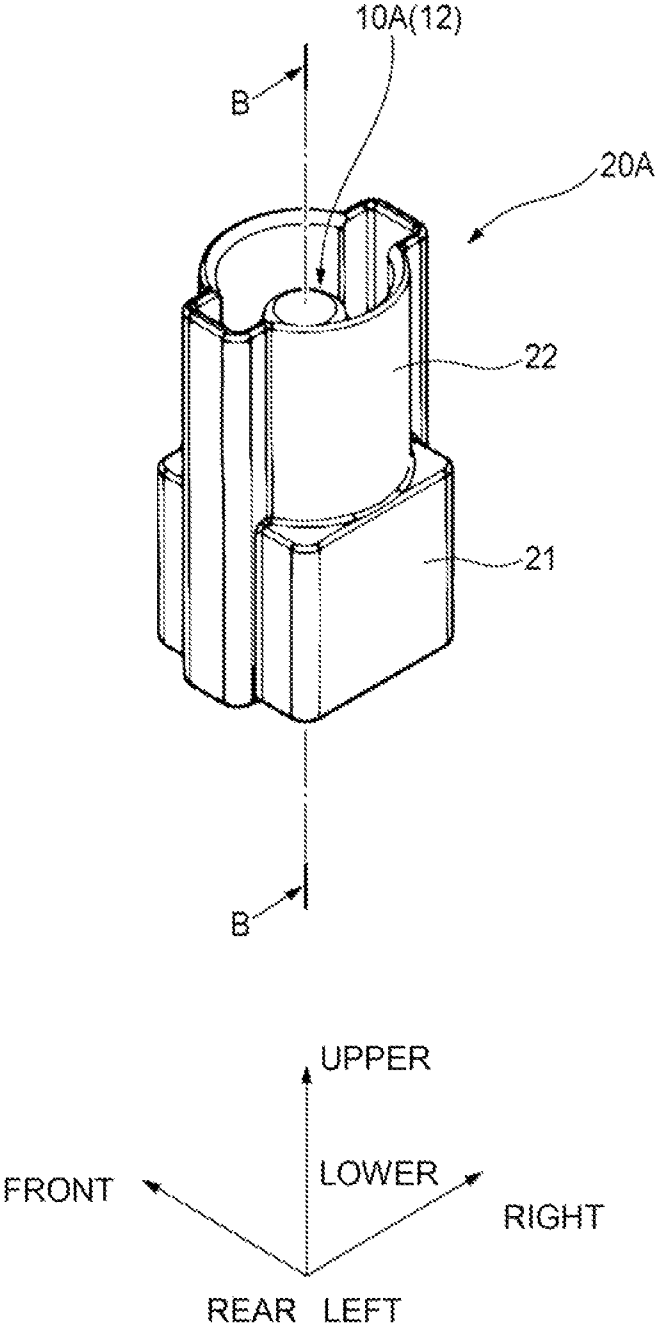
FIG. 4 is a perspective view showing the male connector shown in FIG. 1.
Figure 5:
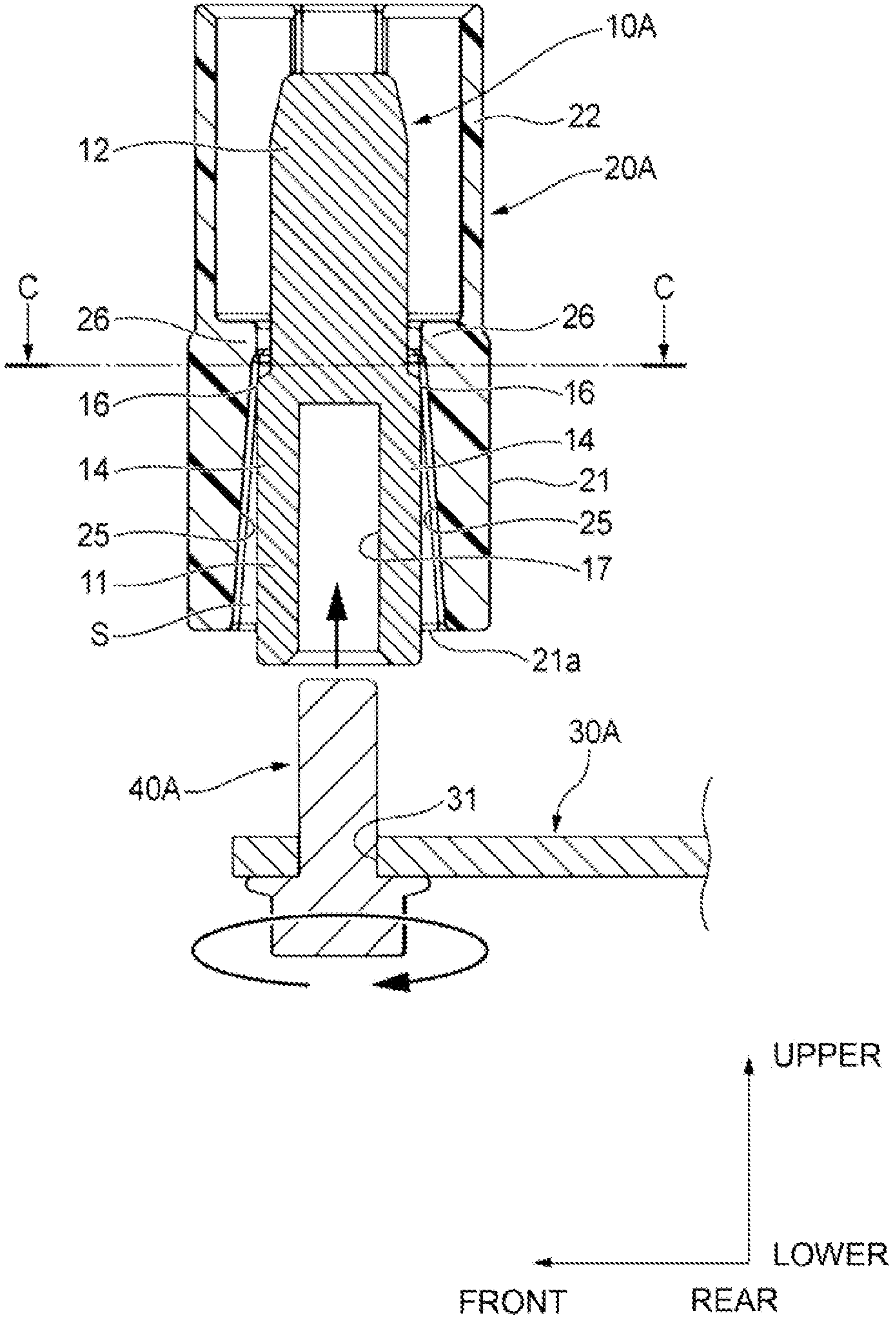
FIG. 5 is a cross-sectional view corresponding to a cross section of FIG. 4 taken along a line B-B for illustrating a state when the external terminal is to be bolted to the male terminal of the male connector shown in FIG. 1.

As shown in FIGS. 2, 3, and 5, the base 11 has a quadrangular prism shape extending in the upper-lower direction, and includes, as outer peripheral side walls, a pair of outer walls 13 disposed to face each other in parallel in the left-right direction, and a pair of outer walls 14 disposed to face each other in parallel in the front-rear direction.

The upper end edge of each outer wall 13 is formed with a flange 15 having a ridge shape protruding outward in the left-right direction and extending in the front-rear direction (see FIGS. 2 and 3). The upper end edge of each outer wall 14 functions as a rotation restricting portion 16. The rotation restricting portion 16 corresponds to the “rotation restricting portion” according to the present disclosure. The operation of the rotation restricting portion 16 will be described later. As shown in FIGS. 3 and 5, a lower end surface of the base 11 is formed with a bolt hole 17 that allows a bolt to be screwed therein. A bolt 40A for bolting the external terminal 30A is screwed into the bolt hole 17 as shown in, for example, FIG. 2.

Next, the male housing 20A will be described. As shown in FIGS. 2, 3, and the like, the male housing 20A is a resin shaped product having a tubular shape extending in the upper-lower direction. The male housing 20A integrally includes a terminal accommodating portion 21 and a fitting portion 22 located above the terminal accommodating portion 21.

The fitting portion 22 has a tubular shape extending in the upper-lower direction while surrounding the outer periphery of the contact 12 of the male terminal 10A accommodated in the male housing 20A with a gap therebetween (see FIG. 4), and protects the contact 12 of the male terminal 10A. Further, the fitting portion 22 of the male housing 20A has a shape capable of being inserted into and fitted to the tubular fitting portion 22 of the female housing 20B (see FIG. 3), and has a function of fitting to the fitting portion 22 of the female housing 20B.

The terminal accommodating portion 21 has a tubular shape that defines a terminal accommodating chamber having a substantially quadrangular prism shape extending in the upper-lower direction in correspondence with the outer shape of the base 11 of the male terminal 10A (see FIGS. 3 and 5), and has a function of accommodating the base 11 of the male terminal 10A. A lower end of the terminal accommodating portion 21 is formed with a substantially rectangular opening 21*a*.

As shown in FIG. 3, a pair of inner walls of the terminal accommodating portion 21 facing each other in the left-right direction are respectively formed with a pair of locking pieces 23 extending upward, while facing each other in the left-right direction, from a pair of end edges of the opening 21*a* facing each other in the left-right direction. Each locking piece 23 is elastically deformable in the left-right direction. A distal end of each locking piece 23 is formed with a protrusion 24 protruding inward in the left-right direction.

As can be understood from FIG. 3, the pair of locking pieces 23 prevent the male terminal 10A accommodated in the terminal accommodating portion 21 from coming off downward due to the engagement with the pair of flanges 15 of the male terminal 10A. The interval in the left-right direction between the pair of locking pieces 23 (upon non-elastic deformation) is slightly wider than the interval in the left-right direction between the distal ends of the pair of flanges 15. The interval in the left-right direction between the distal ends of the protrusions 24 of the pair of locking pieces 23 (upon non-elastic deformation) is slightly narrower than the interval in the left-right direction between the distal ends of the pair of flanges 15 and slightly wider than the interval in the left-right direction between the pair of outer walls 13.

As shown in FIG. 5, the pair of inner walls 25 disposed to face each other in the front-rear direction of the terminal accommodating portion 21 are a pair of flat surfaces parallel to each other except for the upper ends when viewed in the upper-lower direction, and each inclined with respect to the upper-lower direction in an orientation in which the interval therebetween increases toward the lower side (opening 21*a*) when viewed in the left-right direction. The upper ends of the pair of inner walls 25 are respectively formed with a pair of stoppers 26 protruding inward in the front-rear direction. The interval in the front-rear direction between the distal ends of the pair of stoppers 26 is narrower than the interval in the front-rear direction between the pair of outer walls 14 of the male terminal 10. The pair of stoppers 26 function to interfere with the upper end edges of the pair of outer walls 14 of the male terminal 10A (i.e., the rotation restricting portions 16), thereby preventing the male terminal 10A accommodated in the terminal accommodating portion 21 from coming off upward. The components constituting the male connector 1A have been described above.

Next, the assembly of the connector 1A will be described. The connector 1A is formed by accommodating the male terminal 10A in the male housing 20A. More specifically, the male terminal 10A is inserted into the male housing 20A from the lower side through the opening 21*a*. This insertion is continued until the contact 12 moves from the inside of the terminal accommodating portion 21 to the inside of the fitting portion 22, the pair of locking pieces 23 are pressed by the pair of flanges 15 to be subjected to temporary elastic deformation outward in the left-right direction, and then elastically restored, and the pair of flanges 15 are engaged with the protrusions 24 of the pair of locking pieces 23 (see FIG. 3). When the pair of flanges 15 are engaged with the protrusions 24 of the pair of locking pieces 23, the assembly of the male terminal 10A to the male housing 20A is completed, thereby obtaining the connector 1A shown in FIG. 4.

Figure 6:
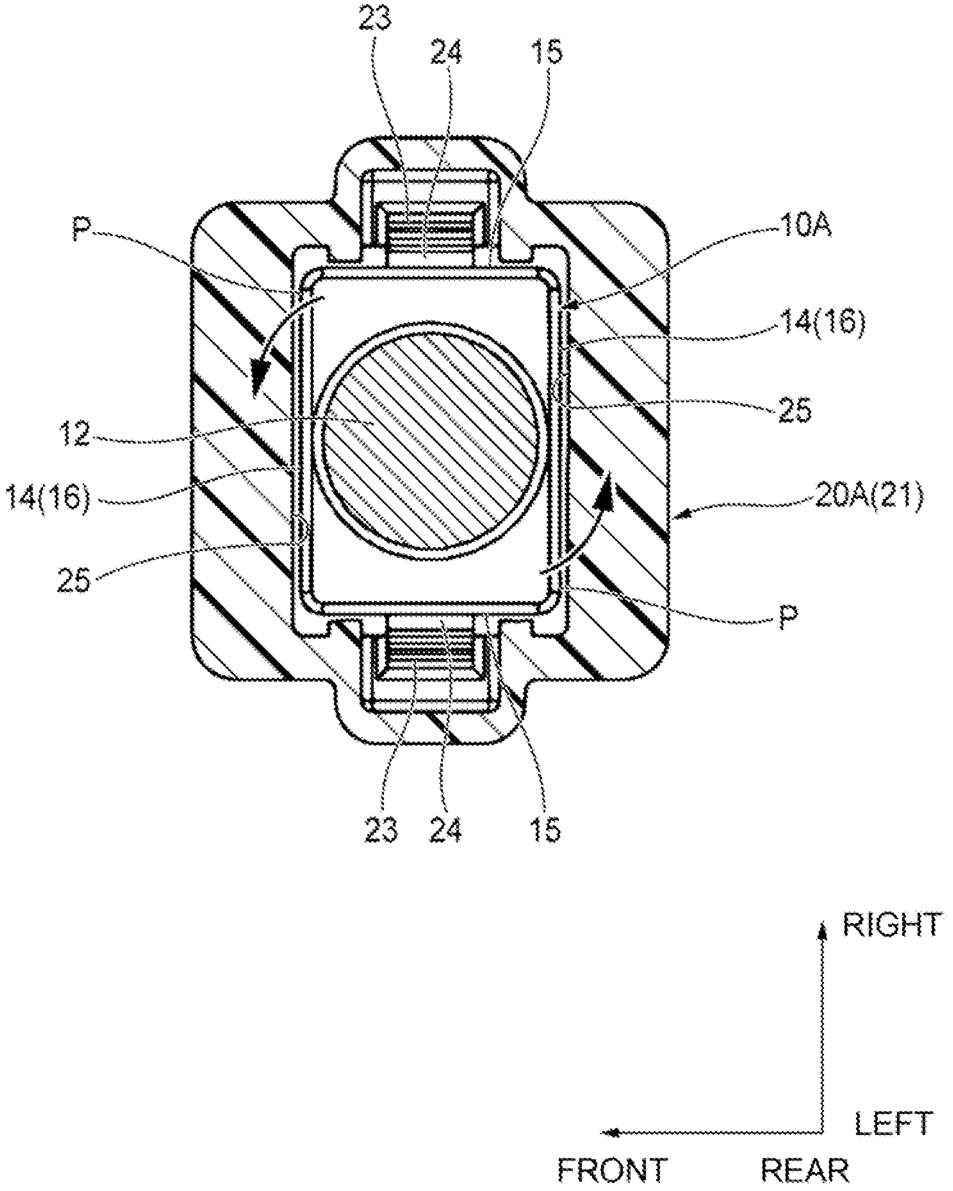
FIG. 6 is a cross-sectional view taken along a line C-C of FIG. 5.

In the assembled state of the connector 1A, as shown in FIGS. 5 and 6, the upper end edges of the pair of outer walls 14 of the male terminal 10A (i.e., the rotation restricting portions 16) and the pair of inner walls 25 of the male housing 20A are engaged with each other, so that the rotation of the male terminal 10A about the axis with respect to the male housing 20A is restricted.

In the assembled state of the connector 1A, as shown in FIG. 5, the gap S between the inner walls 25 and the outer walls 14 of the male terminal 10A is gradually widened from the upper end edges of the outer walls 14 (i.e., the rotation restricting portions 16) toward the opening 21*a* due to the pair of inner walls 25 of the male housing 20A being inclined with respect to the upper-lower direction. Therefore, the male terminal 10A can rotate (swing) in the gap S with respect to the male housing 20A in an orientation in which the upper and lower ends thereof move in the front-rear direction (that is, about an axis extending in the left-right direction).

The pair of locking pieces 23 (protrusions 24) of the male housing 20A are engaged with the pair of flanges 15 in a manner allowing such rotation of the male terminal 10A in the gap S. That is, the engagement between the pair of locking pieces 23 and the pair of flanges 15 does not hinder the rotation of the male terminal 10A. Similarly, since the outer periphery of the contact 12 of the male terminal 10A accommodated in the male housing 20A is surrounded by the tubular fitting portion 22 with a gap therebetween, the tubular fitting portion 22 does not hinder the rotation of the male terminal 10A.

Figure 1:
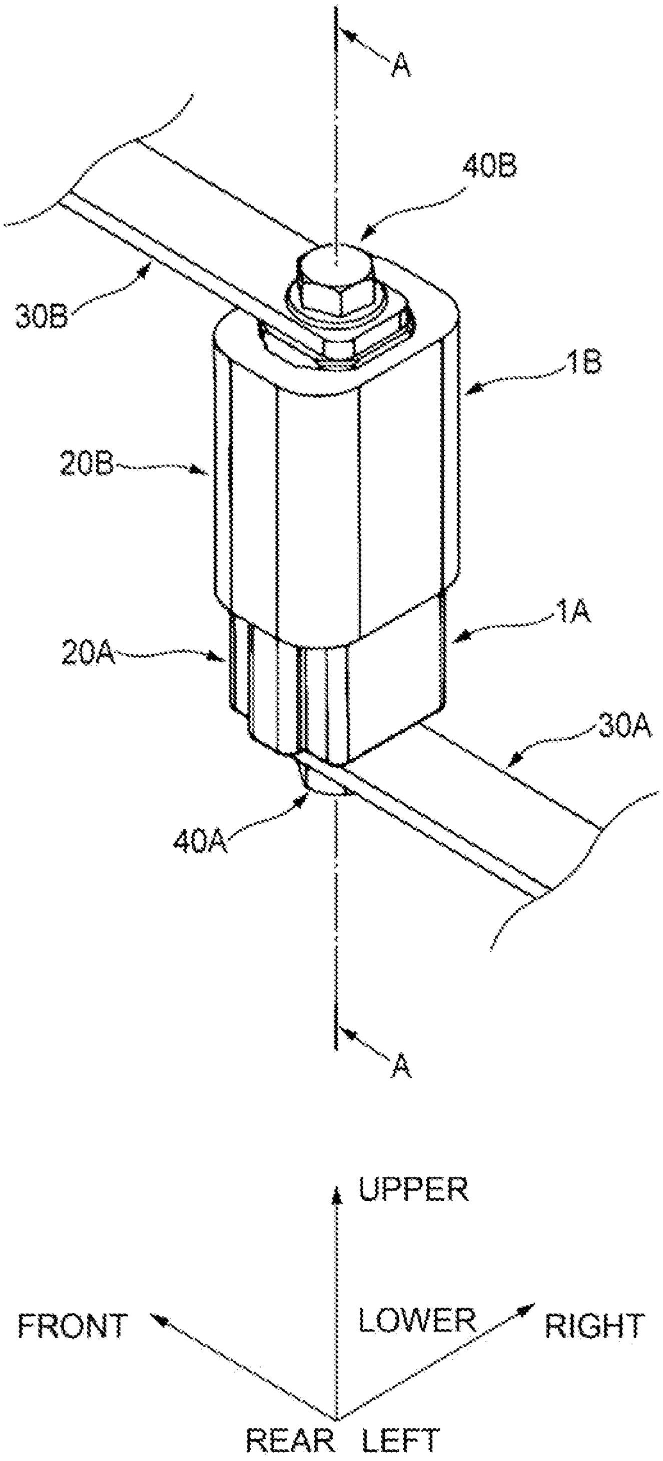
FIG. 1 is a perspective view illustrating a state in which a male connector and a female connector according to an embodiment of the present disclosure, each bolted with an external terminal.

As shown in FIG. 5, the external terminal 30A is bolted to the lower end of the male terminal 10A of the connector 1A after the assembly is completed. In the present example, as shown in FIGS. 1 and 2, the external terminal 30A has an elongated rectangular flat plate shape, and has a through hole 31 formed in one end in the longitudinal direction thereof (see also FIG. 5). By screwing the bolt 40A inserted into the through hole 31 into the bolt hole 17 of the male terminal 10A, the external terminal 30A is fastened and fixed to the male terminal 10A in an orientation in which the other end side in the longitudinal direction thereof extends rearward.

Figure 7:
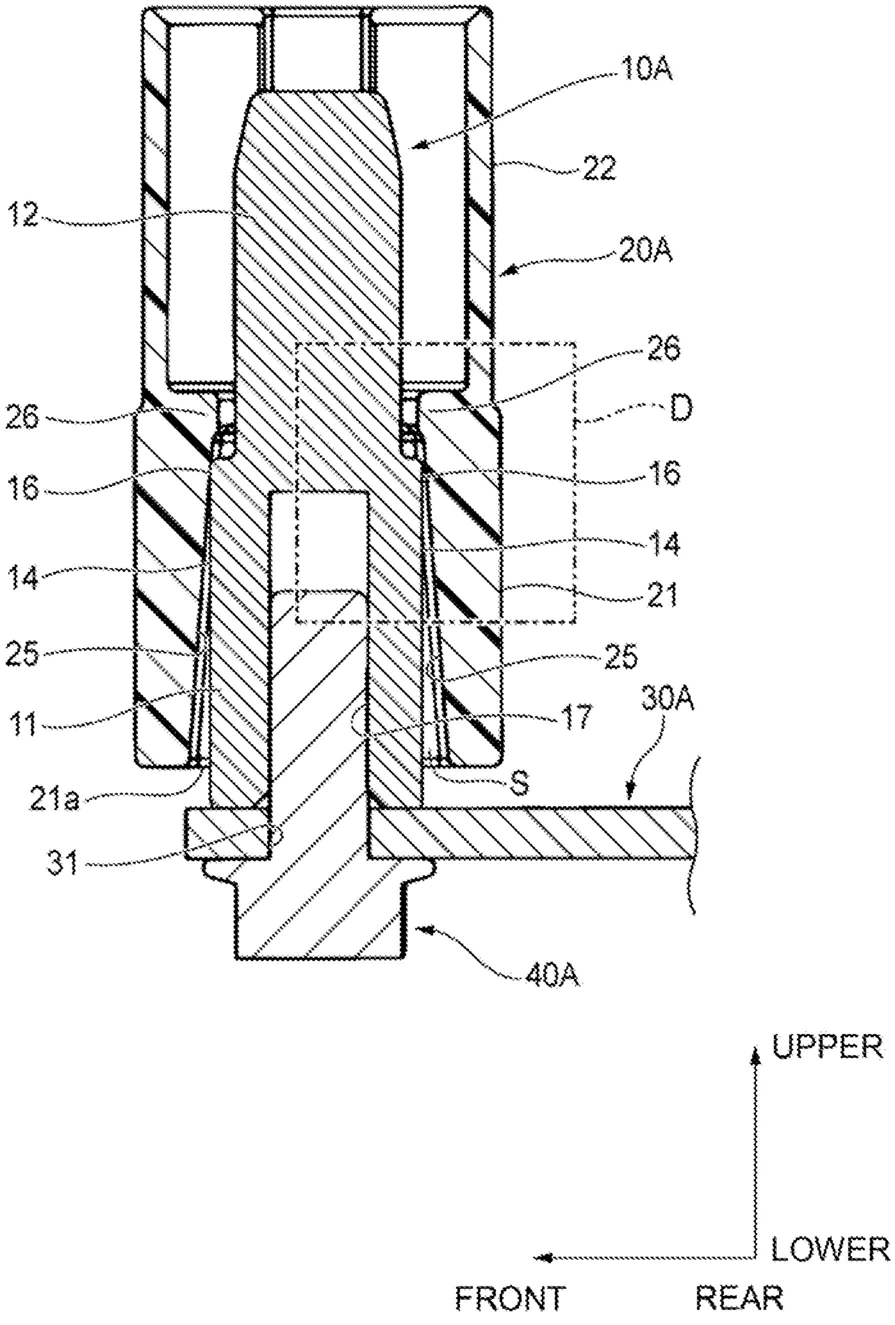
FIG. 7 is a view corresponding to FIG. 5 in a state in which the bolting of the external terminal is completed.
Figure 8:
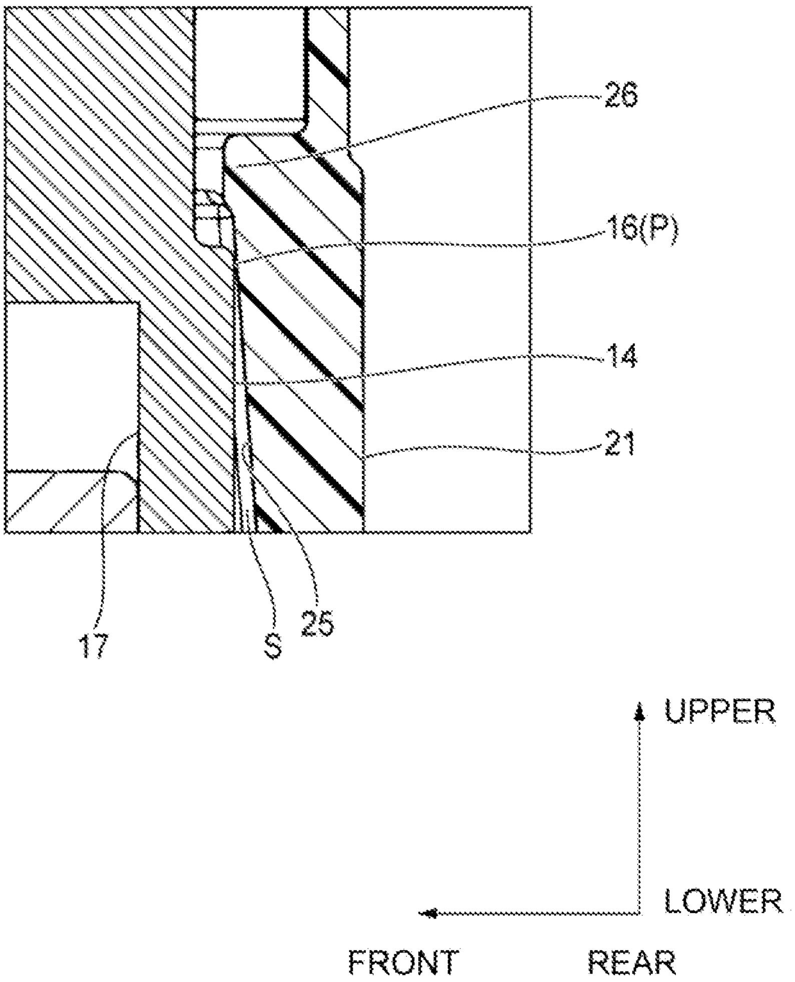
FIG. 8 is an enlarged view of a portion indicated with area D in FIG. 7.

When the bolt 40A is fastened, a fastening torque in an orientation indicated by arrows in FIG. 6 acts on the male terminal 10A, so that ends P of the pair of rotation restricting portions 16 (two outer peripheral corners; see FIG. 6) are respectively in point contact with the pair of inner walls 25 of the male housing 20A (see FIGS. 7 and 8). Even if the ends P are strongly pressed and brought into contact with (engaged with) the inner walls 25 due to the fastening torque, the male terminal 10A can be displaced to rotate (swing) in the gap S with the engagement portion thereof as a fulcrum. Further, since the ends P come into point contact with the inner walls 25, the male terminal 10A can be more easily and properly rotated in the gap S with the engagement portion as a fulcrum. That is, even if axial deviation or inclination of the male terminal 10A occurs at the time of fastening the bolt 40A, the male terminal 10A can be easily returned to the proper position due to the above-described rotation of the male terminal 10A. The male connector 1A has been described above.

Next, the female connector 1B will be described. As illustrated in FIG. 2, the female connector 1B includes the female terminal 10B and the female housing 20B that accommodates the female terminal 10B. As described above, the male connector 1A and the female connector 1B have the same structure except for different types of built-in terminals (the male terminal 10A and the female terminal 10B) and opposite orientations in the upper-lower direction. Therefore, detailed description of the female terminal 10B and the female housing 20B will be omitted hereinafter except for the contact 12 of the female terminal 10B.

As shown in FIG. 3, the contact 12 of the female terminal 10B has a hollow cylindrical tubular shape opened downward. The hollow portion of the contact 12 has a cylindrical columnar shape corresponding to the shape of the contact 12 of the male terminal 10A. A spring-shaped contact 27 (see FIG. 3) is provided on an inner wall surface defining the hollow portion of the contact 12.

In the female connector 1B after the assembly is completed, similar to the male connector 1A, the lower end edges of the pair of outer walls 14 of the female terminal 10B (i.e., the rotation restricting portions 16; see FIG. 2) are engaged with the pair of inner walls 25 (not shown) of the female housing 20B, so that the rotation of the female terminal 10B about the axis with respect to the female housing 20B is restricted.

Further, since the pair of inner walls 25 of the female housing 20B are inclined with respect to the upper-lower direction, the female terminal 10B can rotate (swing) in the gap S (not shown) with respect to the female housing 20B in the orientation in which the upper and lower ends thereof move in the front-rear direction (that is, about an axis extending in the left-right direction). The pair of locking pieces 23 (protrusions 24; see FIG. 3) of the female housing 20B are engaged with the pair of flanges 15 (see FIG. 2) of the female terminal 10B in a manner allowing such rotation of the female terminal 10B in the gap S as described above.

As shown in FIGS. 1 and 2, the external terminal 30B is bolted to the upper end of the female terminal 10B of the connector 1B after the assembly is completed. In the present example, as shown in FIGS. 1 and 2, the external terminal 30B has an elongated rectangular flat plate shape, and has a through hole 31 formed in one end in the longitudinal direction thereof (see FIG. 3). By screwing the bolt 40B inserted into the through hole 31 into the bolt hole 17 of the female terminal 10B (see FIGS. 2 and 3), the external terminal 30B is fastened and fixed to the female terminal 10B in the orientation in which the other end side in the longitudinal direction thereof extends forward.

When the bolt 40B is fastened, a fastening torque acts on the female terminal 10B, so that the ends of the pair of rotation restricting portions 16 of the female terminal 10B (see FIG. 2) are respectively in point contact with the pair of inner walls 25 of the female housing 20B. Even if the ends are strongly pressed and brought into contact with (engaged with) the inner walls 25 due to the fastening torque, the female terminal 10B can be displaced to rotate (swing) in the gap S with the engagement portion thereof as a fulcrum. Further, since the ends P come into point contact with the inner walls 25, the female terminal 10B can be more easily and properly rotated in the gap S with the engagement portion as a fulcrum. That is, even if axial deviation or inclination of the female terminal 10B occurs at the time of fastening the bolt 40B, the female terminal 10B can be easily returned to the proper position due to the above-described rotation of the female terminal 10B. The female connector 1B has been described above.

As illustrated in FIG. 3, the male connector 1A to which the external terminal 30A is fastened and the female connector 1B to which the external terminal 30B is fastened are fitted such that the contact 12 of the male terminal 10A is inserted into the hollow portion of the contact 12 of the female terminal 10B and the fitting portion 22 of the male housing 20A is inserted into the fitting portion 22 of the female housing 20B. At this time, even if the male terminal 10A and the female terminal 10B approach each other in a state of being slightly inclined with respect to each other, at least one of the male terminal 10A or the female terminal 10B rotates (swings) in accordance with the inclination, so that the contact 12 of the male terminal 10A can be easily inserted into the hollow portion of the contact 12 of the female terminal 10B, and the force required for fitting (so-called insertion force) can be reduced. The same applies to the case of separating the male connector 1A and the female connector 1B fitted to each other.

In the fitting completion state of the male connector 1A and the female connector 1B (see FIG. 1), as illustrated in FIG. 3, the contact 12 of the male terminal 10A is pressed and brought into contact with the spring-shaped contact 27 provided in the hollow portion of the contact 12 of the female terminal 10B, so that the male terminal 10A and the female terminal 10B are electrically connected to each other. As a result, the external terminal 30A and the external terminal 30B are electrically connected to each other via the male terminal 10A and the female terminal 10B.

Operation and Effect

As described above, according to the male connector 1A (the same applies to the female connector 1B) of the present disclosure, when the external terminal 30A is bolted to the bolt hole 17 provided in the end of the male terminal 10A, the rotation restricting portions 16 of the male terminal 10A is engaged with the inner walls 25 of the terminal accommodating portion 21, so that the rotation of the male terminal 10A about the axis (that is, co-rotation) is prevented. Further, the gap S is provided between the male terminal 10A and the inner walls 25 of the terminal accommodating portion 21, and the gap S increases from the rotation restricting portions 16 toward the opening 21*a* of the male housing 20A. Therefore, even when the rotation restricting portions 16 and the inner walls 25 of the terminal accommodating portion 21 are strongly engaged with each other due to the bolting of the external terminal 30A by the bolt 40A, the male terminal 10A can be displaced to rotate (i.e., swing) in the above-described gap S with the engagement portion as a fulcrum. That is, even if axial deviation or inclination of the male terminal 10A occurs at the time of bolting, the male terminal 10A can be easily returned to the proper position due to the above-described rotation of the male terminal 10A. In other words, when the male connector 1A and the female connector 1B are to be fitted to each other, even if the female terminal 10B approaches the male terminal 10A in an inclined state, the male terminal 10A rotates according to the inclination, so that the male terminal 10A and the female terminal 10B can be easily connected, and the force required for fitting (so-called insertion force) can be reduced. The same applies to the case of separating the male connector 1A and the female connector 1B fitted to each other. As described above, even when the external terminal 30A is directly bolted to the male terminal 10A, co-rotation of the male terminal 10A is prevented, and the male terminal 10A can be easily inserted into or removed from the female terminal 10B. Therefore, the male connector 1A according to the present embodiment can properly bolt the external terminal 30A to the male terminal 10A accommodated in the male housing 20A.

Further, the rotation restricting portions 16 of the male terminal 10A and the inner walls 25 of the terminal accommodating portion 21 come into point contact with each other upon bolting. This enables to cause the male terminal 10A to rotate about the engagement portion as a fulcrum as described above more easily and properly.

Further, the flanges 15 of the male terminal 10A are locked to the locking pieces 23 (the protrusions 24) in a state where the protrusions 24 of the locking pieces 23 of the male housing 20A allow the rotation of the male terminal 10A. Therefore, the rotation of the male terminal 10A is less likely to be hindered by the locking pieces 23 (the protrusions 24), and the rotation of the male terminal 10A can be generated easily and properly.

OTHER EMBODIMENTS

The present disclosure is not limited to the above embodiments, and various modifications can be adopted within the scope of the present disclosure. For example, the present disclosure is not limited to the above embodiments, and modifications, improvements, and the like can be made as appropriate. In addition, materials, shapes, dimensions, numbers, arrangement positions, and the like of the constituent elements in the above-described embodiment are optional and not limited as long as the object of the present disclosure can be achieved.

In the above embodiment, a part (specifically, the outer peripheral corners) of the outer peripheral surface of the base 11 having a quadrangular prism shape of the male terminal 10A is engaged with the inner walls 25 of the terminal accommodating portion 21 to function as the rotation restricting portions 16. Alternatively, a part (for example, the outer peripheral corners) of the outer peripheral surface of the base 11 having a polygonal columnar shape other than the quadrangular prism shape of the male terminal 10A may be engaged with the inner walls 25 of the terminal accommodating portion 21 to function as the rotation restricting portions 16. Alternatively, protrusions provided on the outer peripheral surface of the base 11 of the male terminal 10A may be engaged with the inner wall 25 of the terminal accommodating portion 21 to function as the rotation restricting portions 16.

Further, in the above-described embodiment, the gap S between the inner walls 25 and the outer walls 14 of the male terminal 10A is gradually widened from the upper end edges of the outer walls 14 (i.e., the rotation restricting portions 16) toward the opening 21*a* due to the pair of inner walls 25 of the male housing 20A being inclined with respect to the upper-lower direction in an orientation in which the interval therebetween is widened as going downward (toward the opening 21*a*). On the other hand, the gap S between the inner walls 25 and the outer walls 14 of the male terminal 10A may be gradually widened from the upper end edges of the outer walls 14 (i.e., the rotation restricting portions 16) toward the opening 21*a* due to the pair of outer walls 14 of the male terminal 10A being inclined with respect to the upper-lower direction in an orientation in which the interval therebetween is narrowed as going downward (toward the opening 21*a*). Alternatively, the gap S may be gradually widened from the upper end edges of the outer walls 14 (i.e., the rotation restricting portions 16) toward the opening 21*a* due to both the pair of inner walls 25 and the pair of outer walls 14 being inclined.

Further, in the above embodiment, the pair of locking pieces 23 of the male housing 20A prevent the male terminal 10A accommodated in the terminal accommodating portion 21 from coming off downward due to the engagement with the pair of flanges 15 of the male terminal 10A. Alternatively, the male terminal 10A accommodated in the terminal accommodating portion 21 may be prevented from coming off downward by blocking the opening 21*a* of the male housing 20A with a cover member.

Further, in the above embodiment, the rotation restricting portions 16 of the male terminal 10A and the inner walls 25 of the terminal accommodating portion 21 come into point contact with each other upon bolting. Alternatively, the rotation restricting portions 16 of the male terminal 10A and the inner walls 25 of the terminal accommodating portion 21 may come into surface contact with each other upon bolting.

Here, features of the embodiment of the connectors 1A, 1B according to the present disclosure described above will be briefly summarized and listed in the following first to sixth aspects.

According to a first aspect of the present disclosure, a connector (1A, 1B) includes a rod-shaped terminal (10A, 10B); and a housing (20A, 20B) having a terminal accommodating chamber (21) configured to accommodate the terminal (10A, 10B). The terminal (10A, 10B) has: a rotation restricting portion (16) configured to engage with an inner wall (25) of the terminal accommodating chamber (21) to restrict rotation of the terminal (10A, 10B) about an axis of the terminal (10A, 10B); a contact (12) positioned on one side of the terminal (10A, 10B) in an axial direction of the terminal (10A, 10B) and configured to be electrically connected to a counterpart terminal; and a hole (17) provided at an end positioned on the other side of the terminal (10A, 10B) in the axial direction and configured to allow a bolt (40A, 40B) to be screwed into the hole (17) about the axis. The housing (20A, 20B) has: a holding portion (23) that holds the terminal (10A, 10B) inside the terminal accommodating chamber (21); and an opening (21*a*) configured to expose the hole (17) of the terminal (10A, 10B) to an outside of the terminal accommodating chamber (21). The connector (1A, 1B) is configured to have a gap (S) between the inner wall (25) of the terminal accommodating chamber (21) and the terminal (10A, 10B), the gap (S) increasing from the rotation restricting portion (16) of the terminal (10A, 10B) toward the opening (21*a*) of the housing (20A, 20B).

According to the connector having the configuration of the first aspect, when the external terminal is bolted to the hole provided in the end of the rod-shaped terminal, the rotation restricting portion of the terminal is engaged with the inner wall of the terminal accommodating chamber, so that the rotation of the terminal about the axis (that is, co-rotation) is prevented. Further, a gap is provided between the terminal and the inner wall of the terminal accommodating chamber, and the gap increases from the rotation restricting portion toward the opening of the housing. Therefore, even when the rotation restricting portion and the inner wall of the terminal accommodating chamber are strongly engaged with each other due to the bolting, the terminal can be displaced such that the terminal rotates (i.e., swings) in the above-described gap with the engagement portion as a fulcrum. Therefore, even if inclination or the like of the terminal occurs at the time of bolting, the terminal can be easily returned to a proper position by the terminal swinging as described above. In other words, when the connector and the counterpart connector are to be fitted to each other, even if the counterpart terminal (for example, the hollow cylindrical tubular female terminal described above) approaches the rod-shaped terminal in an inclined state, the rod-shaped terminal swings according to the inclination, so that the posture of the rod-shaped terminal can be maintained in a posture suitable for connection, and the force required for fitting (that is, the insertion force) can be reduced. The same applies to the case where the fitted connectors are to be separated from each other. As described above, according to the connector of the present disclosure, even when the external terminal is directly bolted to the rod-shaped terminal, co-rotation of the terminal and the like are prevented, and the rod-shaped terminal can be easily inserted into or removed from the counterpart terminal. Therefore, the connector of this configuration can achieve both proper bolting of the external terminal to the rod-shaped terminal and improvement in workability when the counterpart terminal is connected to the rod-shaped terminal.

According to a second aspect of the present disclosure, the rotation restricting portion (16) of the terminal (10A, 10B) is configured to come into point contact with the inner wall (25) of the terminal accommodating chamber (21) when the terminal (10A, 10B) rotates about the axis.

According to the connector having the configuration of the second aspect, the rotation restricting portion of the terminal and the inner wall of the terminal accommodating chamber come into point contact with each other upon bolting. This enables to more easily and properly cause the terminal to rotate about the engagement portion as a fulcrum as described above.

According to a third aspect of the present disclosure, the inner wall (25) of the terminal accommodating chamber (21) has an inclined shape inclined with respect to the axial direction such that the gap (S) increases from the rotation restricting portion (16) toward the opening (21*a*).

According to the connector having the configuration of the third aspect, the inner wall of the terminal accommodating chamber has an inclined shape inclined with respect to the axial direction of the terminal such that the gap increases from the rotation restricting portion toward the opening of the housing. As a result, the gap can be widened as described above.

According to a fourth aspect of the present disclosure, the terminal accommodating chamber (21) of the housing (20A, 20B) has the inclined shape on the inner wall (25) between the opening (21*a*) and a portion with which the rotation restricting portion (16) engages when the terminal (10A, 10B) rotates about the axis.

According to the connector having the configuration of the fourth aspect, the inner wall between the engagement portion between the inner wall of the terminal accommodating chamber and the terminal and the opening of the housing has the above-described inclined shape. As a result, the inclined shape is provided only on the inner wall portion that affects the rotation of the terminal described above, and the degree of freedom in designing the other inner wall portions can be improved.

According to a fifth aspect of the present disclosure, at least one part of the terminal (10A, 10B) in the axial direction has a polygonal columnar shape, and the at least one part includes outer peripheral corner portion that functions as the rotation restricting portion (16).

According to the connector having the configuration of the fifth aspect, at least a part of the terminal has a polygonal columnar shape. For example, a part of the outer peripheral corners of the portion having the polygonal columnar shape is engaged with the inner wall of the terminal accommodating chamber upon bolting, thereby functioning as the rotation restricting portion. Accordingly, the rotation restricting portion can be easily provided in the terminal without requiring a structure or the like having a complicated shape for restricting the rotation of the terminal.

According to a sixth aspect of the present disclosure, the holding portion (23) of the housing (20A, 20B) is configured to lock the terminal (10A, 10B) such that the terminal (10A, 10B) is capable of inclining with an engagement portion between the rotation restricting portion (16) and the inner wall (25) as a fulcrum.

According to the connector having the configuration of the sixth aspect, the terminal is locked to the holding portion in a state where the holding portion of the housing allows the rotation of the terminal. Therefore, the rotation of the terminal described above is less likely to be hindered by the holding portion, and the rotation of the terminal can be generated easily and properly.

What is claimed is:

1. A connector structure comprising:

a rod-shaped terminal; and a housing having a terminal accommodating chamber configured to accommodate the terminal, wherein the terminal has:

a rotation restricting portion configured to engage with an inner wall of the terminal accommodating chamber to restrict rotation of the terminal about an axis of the terminal;

a contact positioned on one side of the terminal in an axial direction of the terminal and configured to be electrically connected to a counterpart terminal; and a hole provided at an end positioned on an other side of the terminal in the axial direction and configured to allow a bolt to be screwed into the hole about the axis, the housing has:

a holding portion that holds the terminal inside the terminal accommodating chamber; and an opening configured to expose the hole of the terminal to an outside of the terminal accommodating chamber;

the connector is configured to have a gap between the inner wall of the terminal accommodating chamber and the terminal, the gap increasing from the rotation restricting portion of the terminal toward the opening of the housing;

the inner wall of the terminal accommodating chamber has an inclined portion inclined with respect to the axial direction such that the gap increases from the rotation restricting portion toward the opening; and the rotation restricting portion of the terminal is configured to engage with the inclined portion of the inner wall of the terminal accommodation chamber.

2. The connector structure according to claim 1, wherein the rotation restricting portion of the terminal is configured to come into point contact with the inner wall of the terminal accommodating chamber when the terminal rotates about the axis.

3. The connector structure according to claim 1, wherein the terminal accommodating chamber of the housing has the inclined shape on the inner wall between the opening and a portion with which the rotation restricting portion engages when the terminal rotates about the axis.

4. The connector structure according to claim 1, wherein at least one part of the terminal in the axial direction has a polygonal columnar shape, and the at least one part includes an outer peripheral corner portion that functions as the rotation restricting portion.

5. The connector structure according to claim 1, wherein the holding portion of the housing is configured to lock the terminal such that the terminal is capable of inclining with an engagement portion between the rotation restricting portion and the inner wall as a fulcrum.

6. The connector structure according to claim 1, wherein the inner wall of the terminal accommodating chamber is at least partly inclined away from the terminal.

* * * * *